United States Patent
Nagami

(10) Patent No.: US 8,553,191 B2
(45) Date of Patent: Oct. 8, 2013

(54) LIQUID CRYSTAL DISPLAY DEVICE AND MANUFACTURING METHOD THEREOF

(75) Inventor: Takahiro Nagami, Mobara (JP)

(73) Assignee: Hitachi Displays, Ltd., Mobara-shi, Chiba (JP)

(*) Notice: Subject to any disclaimer, the term of this patent is extended or adjusted under 35 U.S.C. 154(b) by 105 days.

(21) Appl. No.: 13/296,690

(22) Filed: Nov. 15, 2011

(65) Prior Publication Data

US 2012/0127389 A1 May 24, 2012

(30) Foreign Application Priority Data

Nov. 24, 2010 (JP) ................. 2010-261153

(51) Int. Cl.
G02F 1/1343 (2006.01)

(52) U.S. Cl.
USPC .......................... 349/141; 349/192

(58) Field of Classification Search
USPC .............. 349/141, 139, 192, 143, 43, 142, 349/144
See application file for complete search history.

(56) References Cited

U.S. PATENT DOCUMENTS

| 7,202,929 B2 * | 4/2007 | Ootsu et al. ............ 349/141 |
| 7,209,194 B2 * | 4/2007 | Suzuki et al. ............ 349/55 |
| 7,271,869 B2 * | 9/2007 | Ono et al. ............ 349/143 |
| 7,859,629 B2 * | 12/2010 | Yoon ............ 349/141 |
| 2009/0180069 A1 | 7/2009 | Nishimura | |

FOREIGN PATENT DOCUMENTS

JP 2009168878 7/2009

* cited by examiner

Primary Examiner — Thoi Duong
(74) Attorney, Agent, or Firm — Ulmer & Berne LLP

(57) ABSTRACT

The present invention seeks to decrease the number of pixel defects in an IPS liquid crystal display device. A gate electrode is formed on a TFT substrate, while a gate insulating film is overlaid on the gate electrode. A pixel electrode which is divided into segments is formed on the gate insulating film. The segments of the pixel electrode are normally interconnected by a source electrode. An inter-layer insulating film, on which a common electrode including slits is formed, is overlaid on the pixel electrode. In a case where the common electrode and one of the segments of the pixel electrode are conductively interconnected by a conductive foreign substance, the other segments of the pixel electrode are allowed to operate by disconnecting the conducted segment of the pixel electrode from the source electrode. Thus, one pixel is prevented from lapsing into a full pixel defect.

8 Claims, 17 Drawing Sheets

LIQUID CRYSTAL DISPLAY DEVICE AND MANUFACTURING METHOD THEREOF

CLAIM OF PRIORITY

The present application claims priority from Japanese Patent Application JP 2010-261153 filed on Nov. 24, 2010, the content of which is hereby incorporated by reference into this application.

BACKGROUND OF THE PRESENT INVENTION

1. Field of the Present Invention

The present invention relates to a display device. More particularly, the present invention relates to a liquid crystal display device of horizontal electric field type which is adapted to increase fabrication yield and to decrease manufacturing cost.

2. Related Arts

A liquid crystal display panel for use in liquid crystal display device includes: a TFT substrate on which pixels, each including a pixel electrode, a thin film transistor (TFT) and the like are arranged in a matrix form; a counter substrate opposed to the TFT substrate and formed with a color filter and the like in corresponding relation to the pixel electrode of the TFT substrate; and liquid crystal sandwiched between the TFT substrate and the counter substrate. An image is formed by controlling transmission of light through liquid crystal molecules on a per pixel basis.

The liquid crystal display device has a flat and lightweight structure and hence, finds more and more applications in various fields. Compact size liquid crystal display devices are widely used in cell phones, Digital Still Cameras (DSCs) and the like. Viewing angle characteristics are important in the liquid crystal display devices. The viewing angle characteristics refer to a phenomenon that the image is varied in luminance or chromaticity depending upon whether it is viewed from front or at oblique angle. An In-Plane Switching (IPS) type device capable of operating the liquid crystal molecules by applying a horizontal electric field exhibits excellent viewing angle characteristics.

There are known various types of IPS liquid crystal display devices. An increased transmittance, for example, can be achieved by a type wherein a common electrode is formed of a flat solid layer and an interdigital pixel electrode is laid on the common electrode with an insulating film interposed therebetween and wherein the liquid crystal molecules are rotated by an electric field induced between the pixel electrode and the common electrode. A similar characteristic is afforded by a system having a converse configuration wherein the pixel electrode is formed in a rectangle shape and the common electrode including slits is overlaid on the pixel electrode with the insulating film interposed therebetween and wherein the liquid crystal molecules are rotated by the electric field induced between the common electrode and the pixel electrode. Of these, the system wherein the pixel electrode is formed in the rectangle shape and the common electrode including the slits is overlaid thereon with the insulating film interposed therebetween is going mainstream because this system permits the reduction of the number of conductive films, insulating films or the like.

JP-A No. 2009-168878 discloses another example of the IPS system having a structure wherein a gate electrode and the common electrode are formed on the same layer and wherein the interdigital pixel electrode is formed with a gate insulating film and a protective insulating film interposed therebetween.

FIG. 15 is a plan view showing a pixel configuration on an IPS TFT substrate, which is a subject of the present invention. FIG. 16 is a sectional view taken on the line C-C in FIG. 15. FIG. 15 and FIG. 16 show the configuration wherein a common electrode 108 including slits 1081 is overlaid on a rectangular pixel electrode 106 with an insulating film interposed therebetween. It is noted that the configuration shown in FIG. 15 is different from the IPS structure disclosed in JP-A No. 2009-168878.

Referring to FIG. 15, the pixel electrode 106 is formed on a region enclosed by a picture signal line 20 and a scan line 10. The TFT controlling the supply of a picture signal to the pixel electrode 106 is formed on the scan line 10. That is, the scan line 10 of FIG. 15 doubles as a gate electrode 101 of the TFT. Formed on the scan line 10 is a semiconductor layer 103, on which a drain electrode 104 and a source electrode 105 are formed. The drain electrode 104 is branched from the picture signal line 20. The source electrode 105 is connected to the pixel electrode 106.

The pixel electrode 106 has a rectangular shape. The common electrode 108 including the slits 1081 is overlaid on the pixel electrode 106 with an inter-layer insulating film 107 (not shown) interposed therebetween. The common electrode 108 is common to individual pixels. In FIG. 15, the common electrode 108 is shown cross-hatched.

FIG. 16 is a sectional view taken on the line C-C in FIG. 15. FIG. 16 also shows a configuration of a counter substrate 200 not shown in FIG. 15. Referring to FIG. 16, the scan line 10 doubling as the gate electrode 101 is formed on a TFT substrate 100, while a gate insulating film 102 is overlaid on the scan line 10. The semiconductor layer 103 is formed over the gate electrode 101 with the gate insulating film 102 interposed therebetween. The drain electrode 104 and the source electrode 105 are laid on the semiconductor layer 103. The source electrode 105 is extended on the gate insulating film 102 to be connected with the pixel electrode 106. As shown in FIG. 15, the pixel electrode 106 has the rectangle shape. In FIG. 16, the picture signal line 20 is formed on the right side of the pixel electrode 106 as spaced a distance therefrom. The picture signal line 20, drain electrode 104 and source electrode 105 are formed at the same time, and followed by the formation of the pixel electrode 106. The drain electrode 104 and the like are formed from Cr, for example, while the pixel electrode 106 is formed from ITO.

The inter-layer insulating film 107 is formed from SiN or the like, covering the pixel electrode 106, picture signal line 20, source electrode 105 and drain electrode 104. The common electrode 108 is formed from ITO and overlaid on the inter-layer insulating film 107. The common electrode 108 is formed as a flat solid film common to the individual pixels. However, the common electrode is formed with the slits 1081, as shown in FIG. 1, at places corresponding to the pixel electrode 106. When a picture signal is applied to the pixel electrode 106, lines of electric force are produced between the pixel electrode 106 and the common electrode 108 as shown in FIG. 16. The lines of electric force cause liquid crystal molecules 301 to rotate while an image is formed by controlling the amount of light transmitted through a liquid crystal layer 300. An alignment film 109 for initial orientation of the liquid crystal molecules 301 is overlaid on the common electrode 108.

Referring to FIG. 16, the liquid crystal layer 300 extends over the TFT substrate 100 and is sandwiched between the TFT substrate 100 and the counter substrate 200. The counter substrate 200 is formed with a color filter 201 at an area corresponding to the pixel electrode 106 on the TFT substrate 100. The counter substrate 200 is further formed with black matrices 202 at places corresponding to the TFT, the picture signal line 202 and the like on the TFT substrate 100. An overcoat film 203 is formed, covering the color filter 201 and the back matrices 202. The overcoat film 203 is provided for preventing reaction of the color filter 201 with the liquid crystal layer 300 and planarizing a contact plane with the liquid crystal layer 300. The alignment film 109 for initial orientation of the liquid crystal molecules 301 is formed on the overcoat film 203.

The IPS device of such a configuration has the following problem. As shown in FIG. 17, a conductive foreign substance 500 inadvertently allowed to enter between the pixel electrode 106 and the common electrode 108 shorts out the pixel electrode 106 and the common electrode 108 so that this pixel is disabled, lapsing into a pixel, defect. Although a very few pixel defects are allowable, a significant number of pixel defects lead to failure of the liquid crystal display device itself. Therefore, the presence of the conductive foreign substance 500 as shown in FIG. 17 leads to a decrease in the fabrication yield of the liquid crystal display device.

However, it is difficult to remove the conductive foreign substance 500 completely from the manufacturing steps. The present invention is directed to an increase in the fabrication yield of the liquid crystal display device by obscuring the pixel defect even if the conductive foreign substance invades the inter-layer insulating film 107.

SUMMARY OF THE PRESENT INVENTION

The present invention seeks to overcome the above problem and principally contains the following specific aspects. According to a first principal aspect of the present invention, a liquid crystal display device includes a TFT substrate, a counter substrate and liquid crystal sandwiched between the TFT substrate and the counter substrate, wherein a gate electrode, a gate insulating film and a semiconductor layer are formed on the TFT substrate in this order, and the semiconductor layer has a drain electrode and a source electrode laid thereon, wherein a pixel electrode formed from ITO is laid on the gate insulating film, wherein an insulating film is overlaid on the pixel electrode while a common electrode including a slit and formed from ITO is overlaid on the insulating film, wherein the pixel electrode is divided into a plurality of segments, each of which is connected to the source electrode, and wherein the segment of the pixel electrode is overlapped with the slit of the common electrode.

According to a second principal aspect of the present invention, a liquid crystal display device includes a TFT substrate, a counter substrate and liquid crystal sandwiched between the TFT substrate and the counter substrate, wherein a gate electrode extending in a first direction, a gate insulating film and a semiconductor layer are formed on the TFT substrate in this order, and a drain electrode, a first source electrode extending in a second direction perpendicular to the first direction and opposed to the drain electrode, as well as a second source electrode extending in a third direction perpendicular to the first direction and opposite to the second direction and opposed to the drain electrode are formed on the semiconductor layer, wherein a first pixel electrode formed from ITO is laid on the gate insulating film and extends in the second direction with respect to the gate electrode, wherein a second pixel electrode formed from ITO is laid on the gate insulating film and extends in the third direction with respect to the gate electrode, and wherein an insulating film is overlaid on the first and second pixel electrodes while a common electrode formed from ITO is overlaid on the insulating film, the common electrode formed with slits in correspondence to respective ones of the first pixel electrode and the second pixel electrode.

In the case of conduction between one of the segments of the pixel electrode and the common electrode, the conducted segment of the pixel electrode is disconnected from the source electrode by applying laser radiation whereby the operation of the other segments of the pixel electrode can be maintained.

According to the present invention, the pixel in a picture element is divided into the segments. Therefore, even if the common electrode in the upper layer is conductively connected with any one of the segments of the pixel electrode, the operation of the other segments of the pixel electrode can be maintained by disconnecting the conducted segment of the pixel electrode from the source electrode. Thus, the pixel is prevented from lapsing into a full pixel defect. Accordingly, the present invention can increase the fabrication yield of the liquid crystal display device.

BRIEF DESCRIPTION OF TEE DRAWINGS

DETAILED DESCRIPTION OF THE PREFERRED EMBODIMENTS

The contents of the present invention will be specifically described with reference to the embodiments thereof.

First Embodiment

Figure 1:
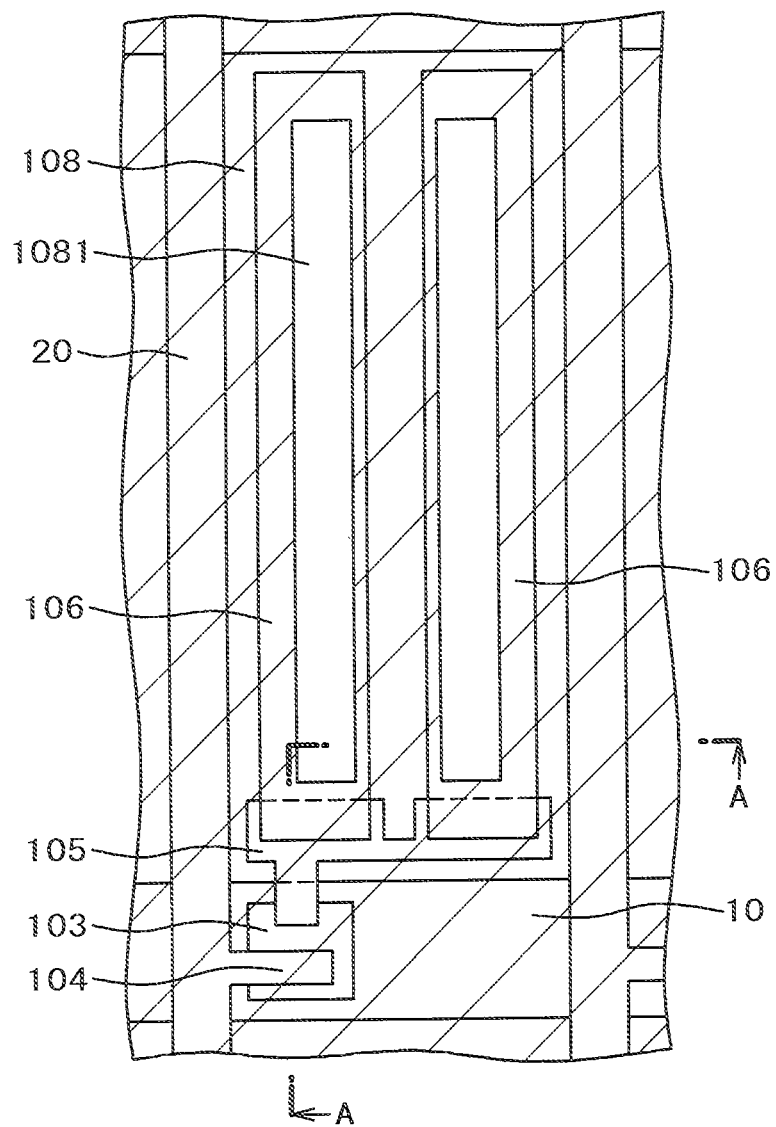
FIG. 1 is a plan view showing a pixel on a TFT substrate according to a first embodiment of the present invention.
Figure 2:
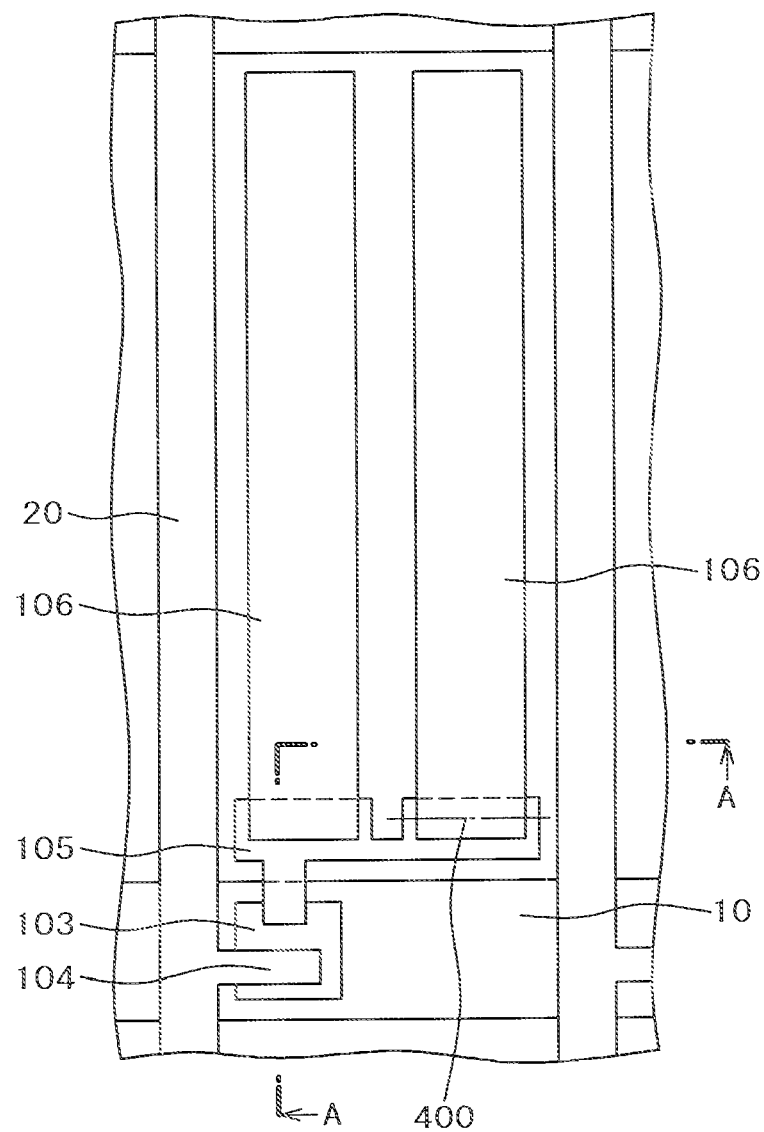
FIG. 2 is a plan view showing the pixel of FIG. 1 from which a common electrode is removed.
Figure 3:
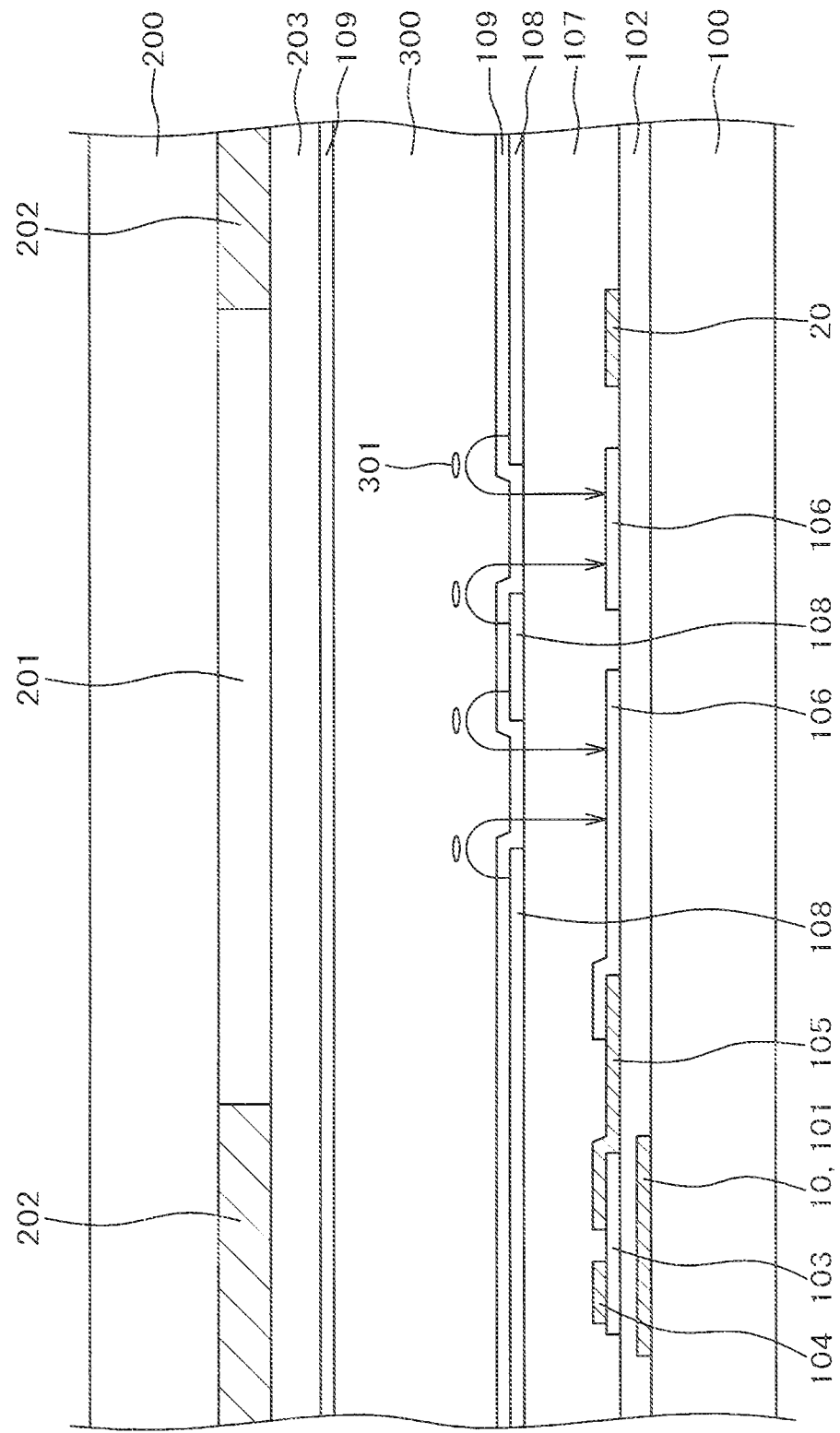
FIG. 3 is a sectional view showing a liquid crystal display panel according to the first embodiment.

FIG. 1 is a plan view showing a pixel portion on a TFT substrate 100 according to the present invention. FIG. 2 is a plan view showing the pixel portion of FIG. 1 from which a common electrode 108 is removed. FIG. 3 corresponds to a sectional view taken on the line A-A in FIG. 1, also including a cross-section of a counter substrate 200. Referring to FIG. 1, a pixel electrode 106 is formed on a region enclosed by a picture signal line 20 and a scan line 10. The pixel electrode 106 is divided into two segments. A common electrode 108 formed of a flat solid layer is formed over the pixel electrode 106 with an inter-layer insulating film 107 (not shown) interposed therebetween. In FIG. 1, the common electrode 108 is shown cross-hatched.

Slits 1081 of the common electrode 108 are located above the pixel electrode 106. Lines of electric force are emitted from the common electrode 108 to the pixel electrode 106 via the slits 1081 in the common electrode 108, so as to control liquid crystal molecules 301. The two pixel electrode segments 106 are interconnected by a common source electrode 105 of a TFT. The TFT is formed on the scan line 10, which doubles as a gate electrode 101. A drain electrode 104 of the TFT is branched from the picture signal line 20. The drain electrode 104 and the source electrode 105 are opposed to each other on a semiconductor layer 103.

FIG. 2 is the plan view showing the pixel region with the common electrode 108 of FIG. 1 removed to allow easy comprehension of a plane composition of the pixel. Referring to FIG. 2, the two pixel electrode segments 106 of rectangle shape are spaced from each other. The two pixel electrode segments 106 are interconnected by the source electrode 105 on the TFT substrate 100. In a case where one of the two pixel electrode segments 106 fails, the failed one of the pixel electrode segments 106 can be disconnected from the other by applying laser radiation along a cut line 400, for example. FIG. 2 shows an exemplary case where the right-hand pixel electrode segment 106 has failed.

It is noted here that despite the failure of a half of the pixel shown in FIG. 2, the pixel defect can be obscured because the other half of the pixel is still active. In a case where the pixel of FIG. 2 is set to white, for example, one of the pixel electrode segments 106 is active so that the pixel can maintain one-half of the lightness of the full pixel. Hence, the pixel does not suffer a black dot defect, preventing the failure of the liquid crystal display device.

Figure 16:
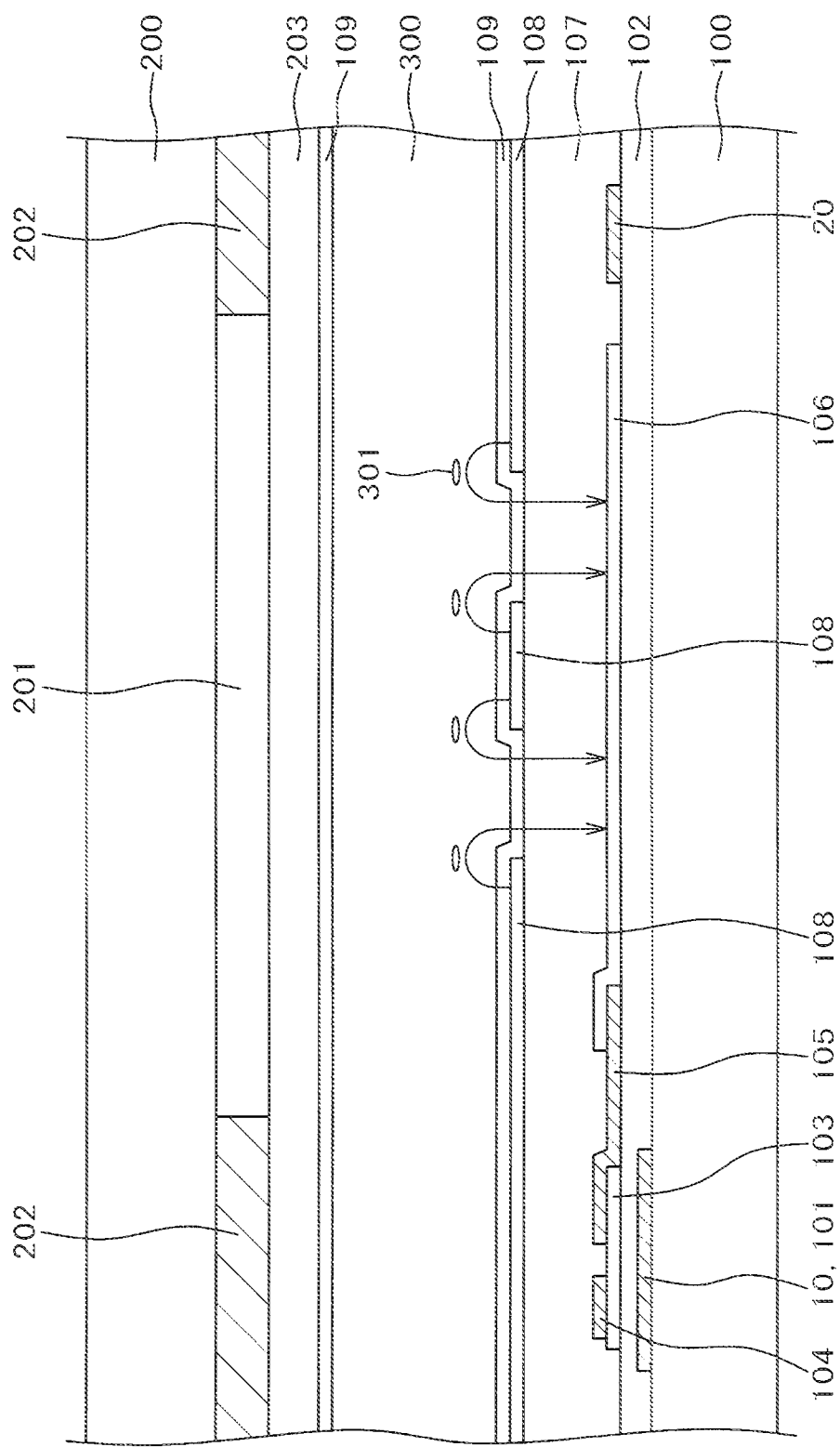
FIG. 16 is a sectional view showing a liquid crystal display panel, corresponding to a sectional view taken on the line C-C in FIG. 15.
Figure 17:
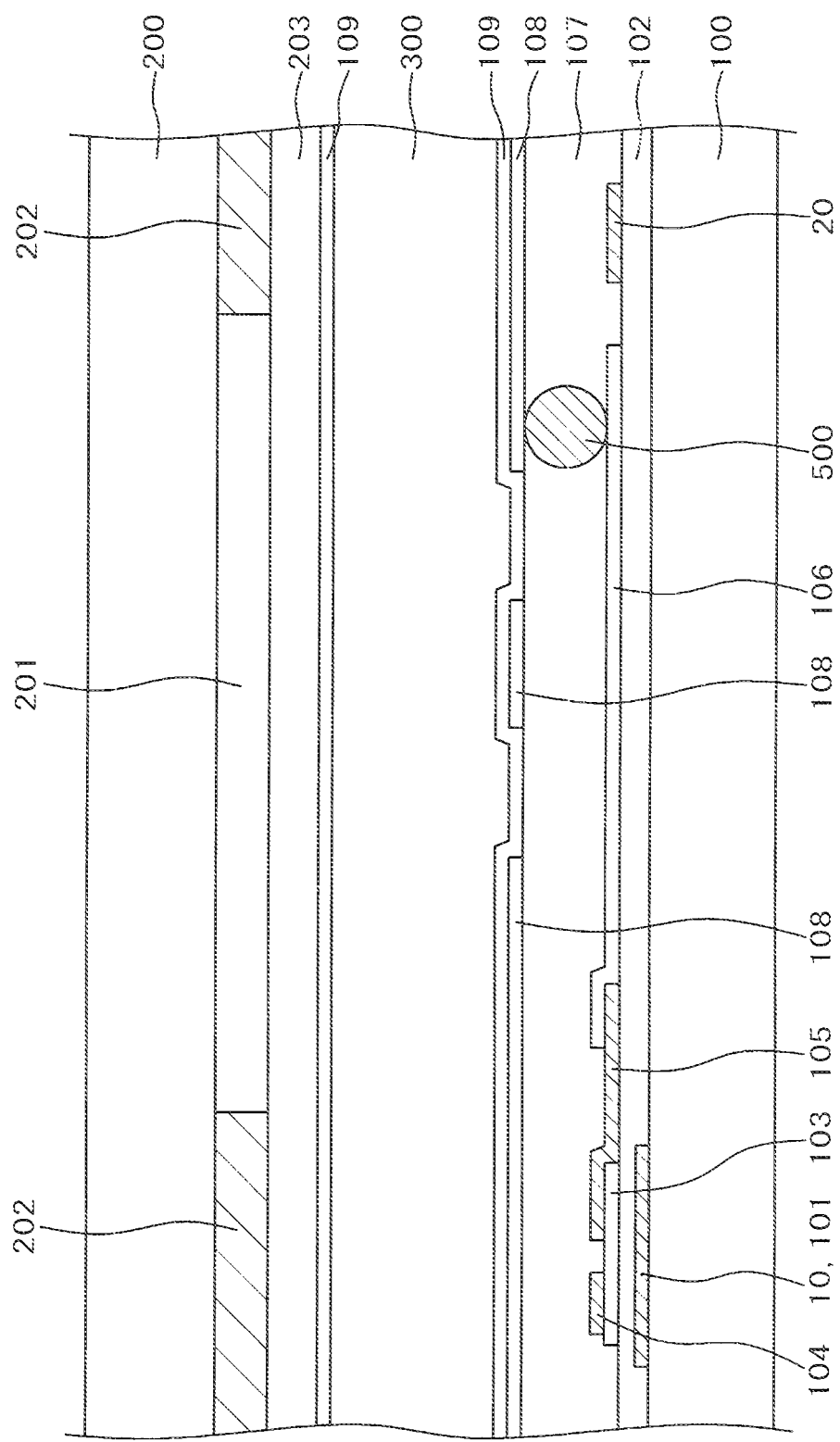
FIG. 17 is a sectional view illustrating a problem of the configuration shown FIG. 15.

FIG. 3 corresponds to the sectional view taken on the line A-A in FIG. 1 and also includes the cross-section of the counter substrate 200, thus showing a liquid crystal display panel in section. A cross-section structure of the liquid crystal display panel is already described with reference to FIG. 16 and hence, a detailed description thereof is dispensed with. FIG. 3 differs from FIG. 16 in that the pixel electrode 106 shown in FIG. 3 is divided into segments. However, the both figures illustrate the structure wherein the lines of electric force are emitted from the common electrode 108 to the two pixel electrodes 106 via the two slits 1081 formed in the common electrode 108, controlling the liquid crystal molecules 301.

While the interconnection of the two pixel electrode segments 106 is not shown in FIG. 3, the pixel electrode segments 106 are interconnected by the source electrode 105 shown in FIG. 1 or FIG. 2. Despite the segmented pixel electrode 106, the pixel is adapted to control the liquid crystal molecules 301 the same way as in FIG. 16 or the like. Let us assume a case where such a pixel structure encounters invasion of the conductive foreign substance 500 into one of the pixel electrode segments 106, as shown in FIG. 4

Figure 4:
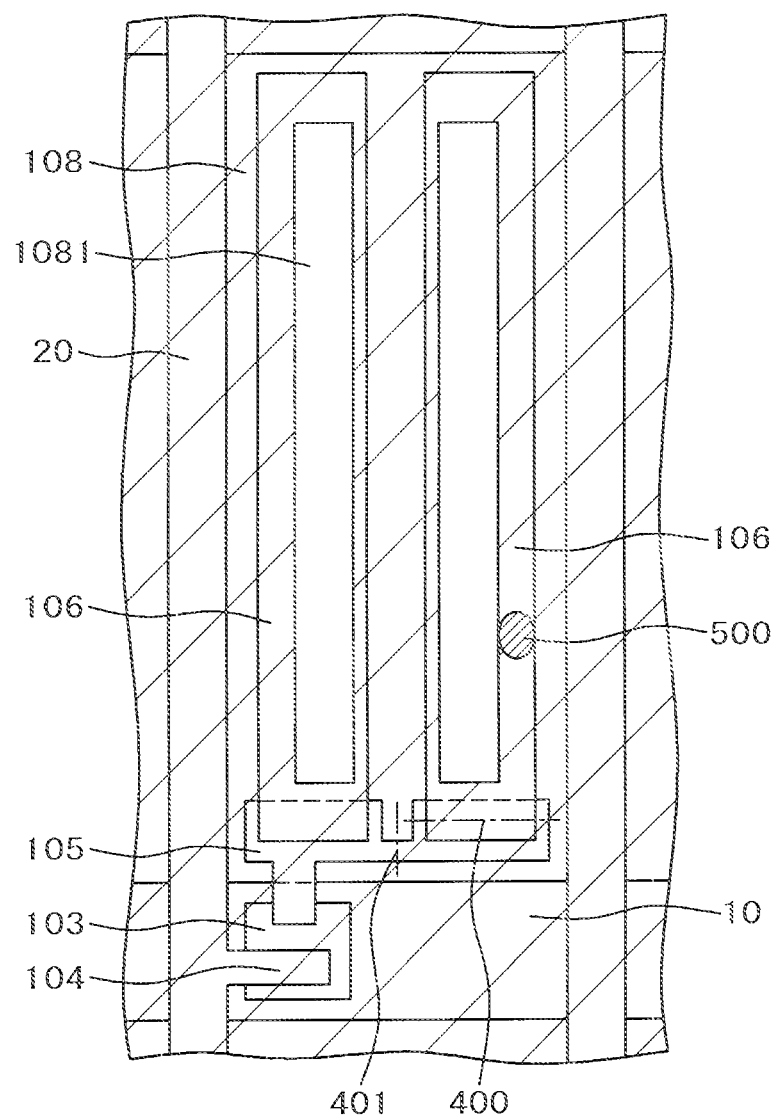
FIG. 4 is a plan view showing an exemplary case where a conductive foreign substance is present between a pixel electrode and the common electrode on the TFT substrate of the present invention.

Referring to FIG. 4, the conductive foreign substance 500 is present between the right-hand pixel electrode segment 106 and the common electrode 108. In this case, the common electrode 108 and the pixel electrode segment 106 are shorted out so that the electric field is not produced between the common electrode 108 and the pixel electrode segment 106, resulting in the failure of this pixel. However, the right-hand pixel electrode segment 106 is disconnected from the left-hand pixel electrode segment 106 by applying the laser radiation along the cut line 400 shown in FIG. 4.

In FIG. 4, the right-hand pixel electrode segment suffers the defect. Cutting this pixel electrode segment on the cut line 400, for example, allows the left-hand pixel electrode segment 106 to operate normally so that the pixel in question is prevented from lapsing into a total defect. If the left-hand pixel electrode segment 106 closer to the TFT fails, the right-hand pixel electrode segment 106 is allowed to operate normally by implementing the cut line 400 on the left-hand pixel electrode segment 106. In the case of failure of the right-hand pixel electrode segment 106, this pixel electrode segment may also be disconnected by cutting on a cut line 401 instead of the cut line 400.

Figure 5:
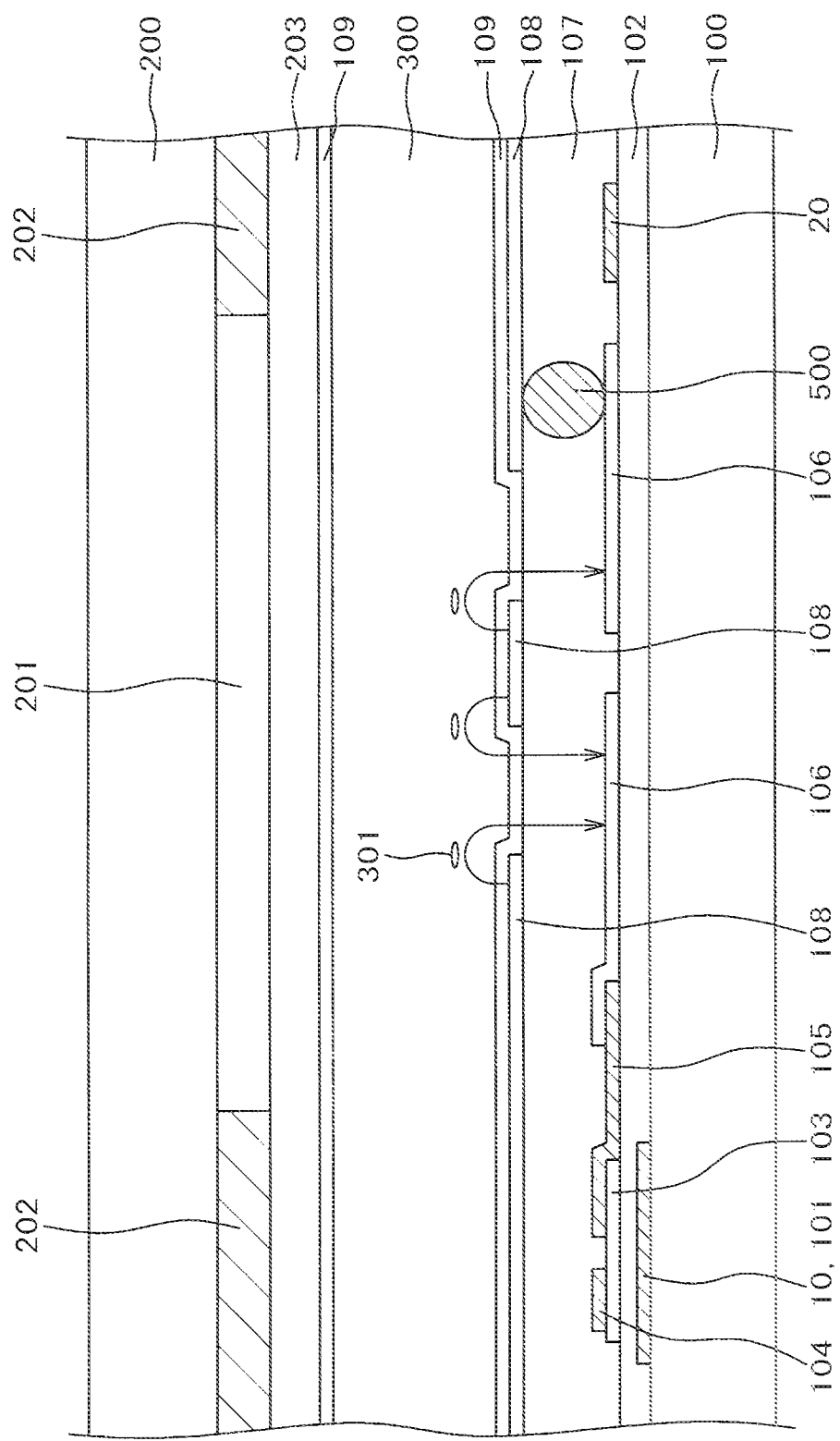
FIG. 5 is a sectional view showing the exemplary case where the conductive foreign substance is present between the pixel electrode and the common electrode of the liquid crystal display panel of the present invention.

FIG. 5 is a sectional view illustrating the operation described with reference to FIG. 4. Referring to FIG. 5, the pixel electrode 106 is divided into the left-hand and right-hand segments. The conductive foreign substance 500 enters space between the right-hand pixel electrode segment 106 and the common electrode 108 and conductively interconnecting these electrodes. Therefore, the line of electric force is not produced between the right-hand pixel electrode segment 106 and the common electrode 108. On the other hand, as shown in FIG. 4, the left-hand pixel electrode segment 106 is disconnected from the right-hand pixel electrode segment 106 by the cut line 400 so that the left-hand pixel electrode segment 106 is not affected by the right-hand pixel electrode segment 106.

Therefore, the lines of electric force are produced between the left-hand pixel electrode segment 106 and the common electrode 108 and applied to the left-hand pixel electrode segment 106 via the slits 1081 in the common electrode 108 so that the liquid crystal molecules 301 can be controlled. That is, a half of the pixel region is affected by the presence of the conductive foreign substance 500. Therefore, the defect is obscured and the pixel is prevented from lapsing into a full pixel defect.

Figure 6:
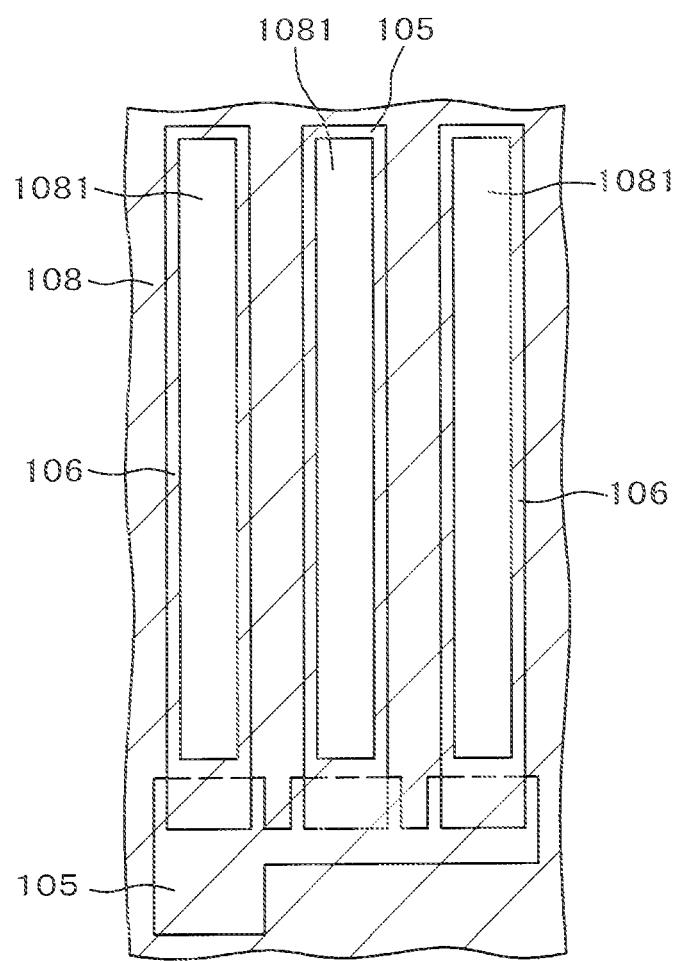
FIG. 6 is a plan view showing another example of the pixel electrode and the common electrode according to the first embodiment.

FIG. 6 shows another example of the pixel electrode 106 and common electrode 108. In FIG. 1, each of the pixels is configured such that the common electrode 108 includes two slits 1081 while two pixel electrode segments 106 are provided. However, the number of slits 1081 or pixel electrode segments 106 need not necessarily be limited to two. FIG. 6 is a plan view showing an exemplary configuration of each pixel wherein the common electrode 108 includes three slits 1081 and three pixel electrode segments 106 are provided. Each of the pixel electrode segments 106 is located in correspondence to each of the slits 1081. Only the common electrode 108, the pixel electrode segments 106 and the source electrode 106 are shown in FIG. 6, in which the common electrode 108 is shown cross-hatched.

Figure 7:
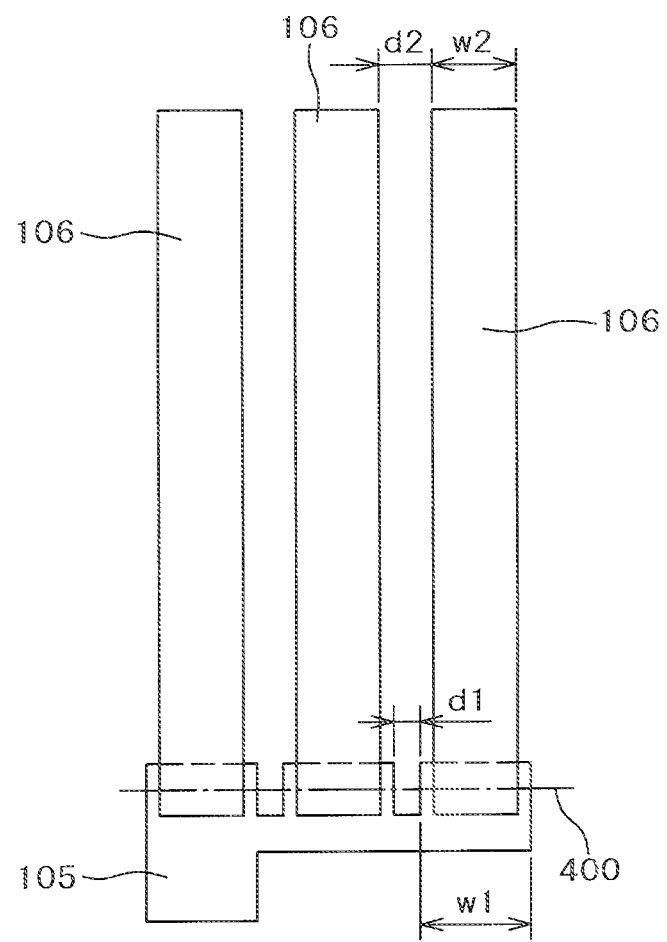
FIG. 7 is a plan view showing the configuration of FIG. 6 from which the common electrode is removed.

FIG. 7 shows the pixel of FIG. 6 from which the common electrode 108 is removed. Referring to FIG. 7, in a case where any one or the three pixel electrode segments 106 fails, the failed pixel electrode segment 106 can be disconnected from the other pixel electrode segments 106 by cutting on the cut line 400. In this case, only one of the three sub-pixels fails and hence, the pixel defect can be further obscured as compared with the case shown in FIG. 1 and the like.

While FIG. 6 and FIG. 7 show the example where the pixel electrode 106 is divided into three segments, the divisor is not limited to three. The pixel electrode may be divided into our or more segments. The devisor depends upon a pixel size and processing accuracy. The increase in the number of segments of the pixel electrode 106 does not lead to the increase in the number of steps. In the examples shown in FIG. 1, FIG. 4, FIG. 6 and the like, the number of slits 1081 formed in the common electrode 108 is equal to the number of segments of the pixel electrode 106 but these numbers need not necessarily be equal to each other. The segmentation of the pixel electrode 106 is important because the present invention seeks to obscure the pixel defect by dividing the pixel electrode 106 into segments. So long as the lines of electric force can be emitted from the common electrode 108 to the pixel electrode 106 via the slits 1081, the number of slits 1081 in the common electrode. 108 need not necessarily be equal to the number of the segments of the pixel electrode 106.

However, it is preferred that the slits 1081 of the common electrode 108 are overlapped with the segments of the pixel electrode 106. Therefore, the segment of the pixel electrode 106 may preferably have a greater width than that of the slit 1081 in the common electrode 108. It is preferred that the width of the pixel electrode 106 is greater than that of the silt in the common electrode 108 by more than mask registration accuracy.

In FIGS. 1, 2, 4, 6, 7 and the like, the width w1 of a digit of the interdigital source electrode 105 is greater than the width w2 of the segment of the pixel electrode 106 with respect to the cut line 400 for laser radiation. In this case, as shown in FIG. 7, the interdigital distance d1 of the source electrode 105 is the smallest. The distance d2 between the segments of the pixel electrode 106 is greater than the interdigital distance d1 of the source electrode 105. In the state of the art, the minimum processing accuracy is on the order of 3 μm. In a case where the minimum processing accuracy is set to the distance d1, the configuration of FIG. 7 may not allow for a sufficiently great width w for the segment of the pixel electrode 106.

Figure 8:
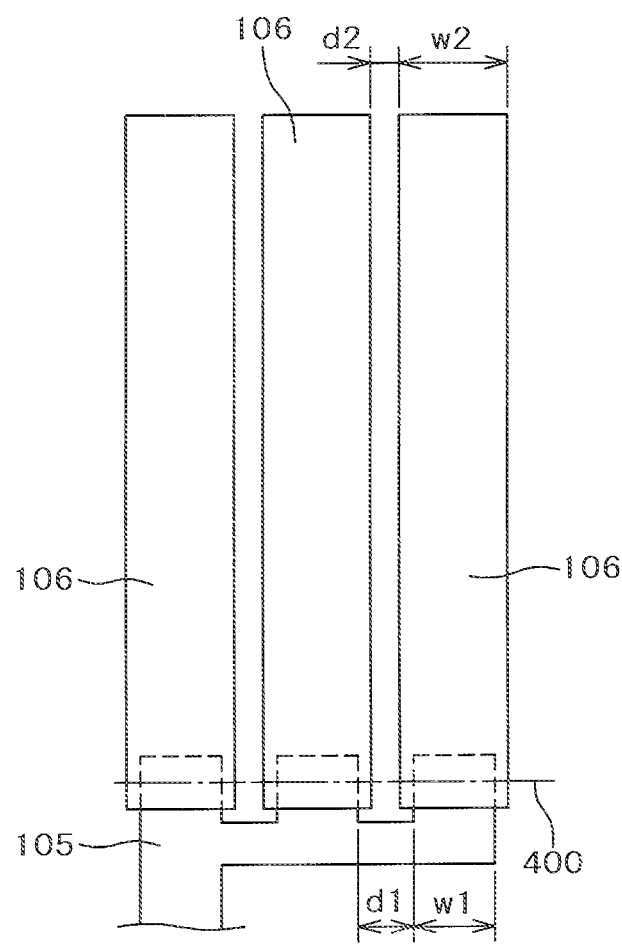
FIG. 8 is a diagram showing another exemplary relation between the pixel electrode and the common electrode according to the first embodiment.

FIG. 8 shows a configuration addressing this problem. Referring to FIG. 8, the width w1 of the digit of the interdigital source electrode 105 is smaller than the width w2 of the segment of the pixel electrode 106. The distance d2 between the segments of the pixel electrode 106 is greater than the interdigital distance d1 of the interdigital source electrode 105. That is, the configuration of FIG. 8 defines a greater width w2 of the segment of the pixel electrode 106 than that of the configuration of FIG. 7. Therefore, the configuration allows for a substantial margin for the registration of the slit 1081 of the common electrode 108 with the pixel electrode 106.

Second Embodiment

Figure 9:
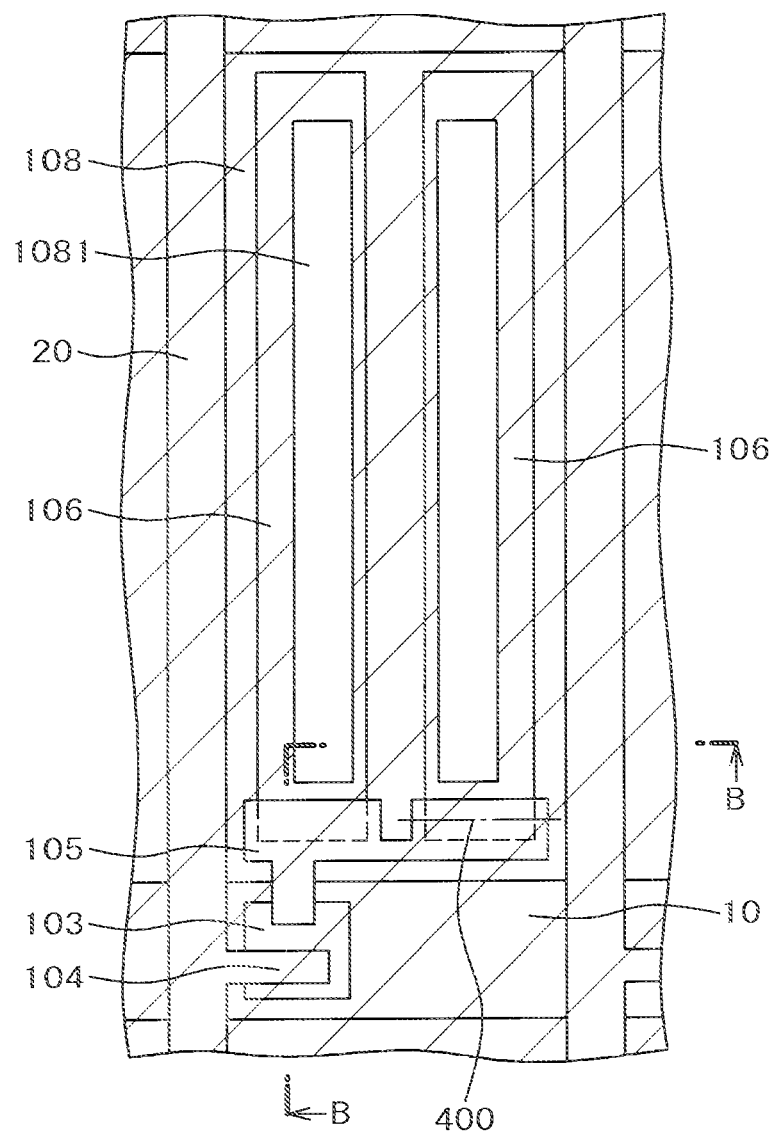
FIG. 9 is a plan view showing a pixel on a TFT substrate according to a second embodiment of the present invention.

FIG. 9 is a plan view showing a configuration of a pixel portion according to the present invention. The configuration of FIG. 9 is the same as that of FIG. 1 except for the connection between the source electrode 105 and the pixel electrode 106. The difference between FIG. 1 and FIG. 9 is that the segments of the pixel electrode 106 shown in FIG. 1 are overlapped on the source electrode 105 at the connection therewith whereas the source electrode 105 shown in FIG. 9 is overlapped on the segments of the pixel electrode 106. However, the configurations of FIG. 9 and FIG. 1 mean the same in that the source electrode 105 and the segments of the pixel electrode 106 are in direct contact with each other. The configuration of FIG. 9 is characterized by eliminating a problem that development of ITO for forming the pixel electrode 106 does not entail corrosion of the picture signal line 20, the source electrode 105 and the like by a developing solution.

Figure 10:
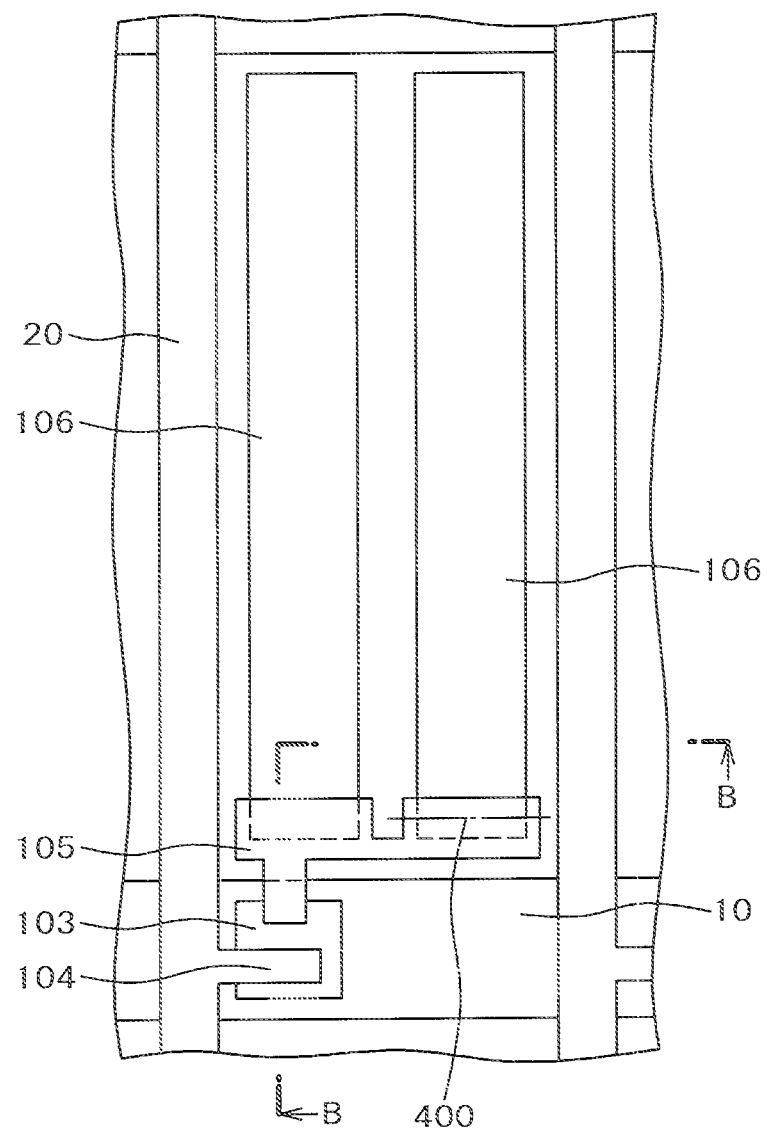
FIG. 10 is a plan view showing the pixel of FIG. 9 from which a common electrode is removed.

FIG. 10 is a plan view showing the picture portion of FIG. 9 from which the common electrode 108 is removed. FIG. 10 differs from FIG. 2 in that the source electrode 105 is overlapped on the segments of the pixel electrode 106. Even if the source electrode 105 is overlapped on the pixel electrode 106, one segment of the pixel electrode 106 can be electrically disconnected from the other segment of the pixel electrode 106 by applying the laser radiation on the cut line 400 shown in FIG. 10. While FIG. 10 illustrates the disconnection of the right-hand segment of the pixel electrode 106, the left-hand segment of the pixel electrode 106 can be disconnected the same way.

Figure 11:
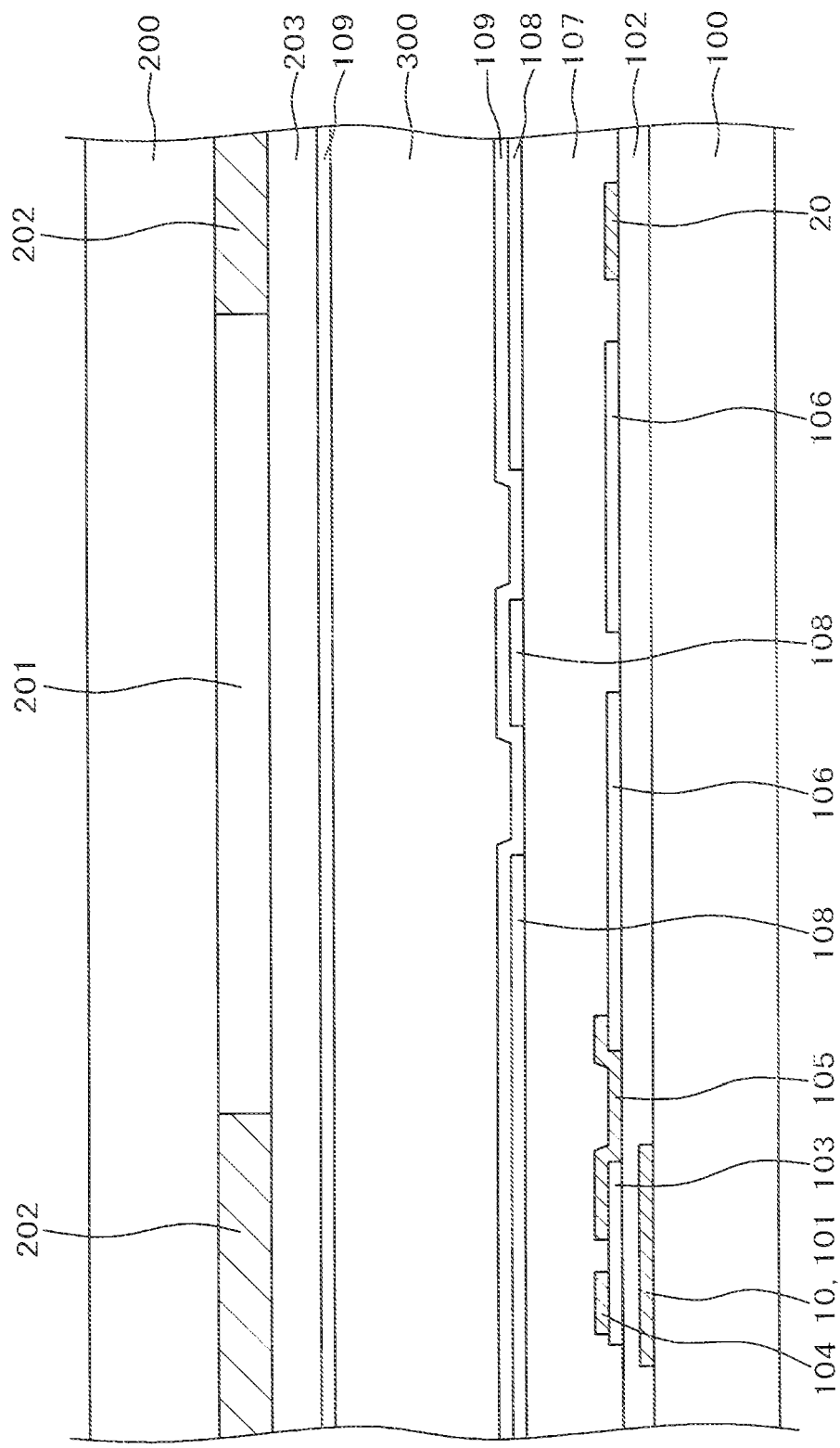
FIG. 11 is a sectional view showing a liquid crystal display device according to the second embodiment.

FIG. 11 corresponds to a sectional view taken on the line B-B in FIG. 9, showing a cross section of a liquid crystal display panel. The difference between FIG. 11 and FIG. 3 is that the source electrode 105 is overlapped on the pixel electrode 106 at the connection. Except for this, the configuration of FIG. 11 is the same as that of FIG. 3. Further, the liquid crystal display panel operates the same way as that of FIG. 3. FIG. 9 to FIG. 11 show the common electrode 108 including two slits 1081 and the pixel electrode 106 divided into two segments. In the configuration of this embodiment, however, the common electrode 108 may also include three or more slits 1081 and the pixel electrode 106 may also be divided into three or more segments. Further, the number of slits 1081 of the common electrode 108 need not necessarily be equal to the number of segments of the pixel electrode 106. Any of the other features of the first embodiment described above is applicable to this embodiment.

Third Embodiment

Figure 12:
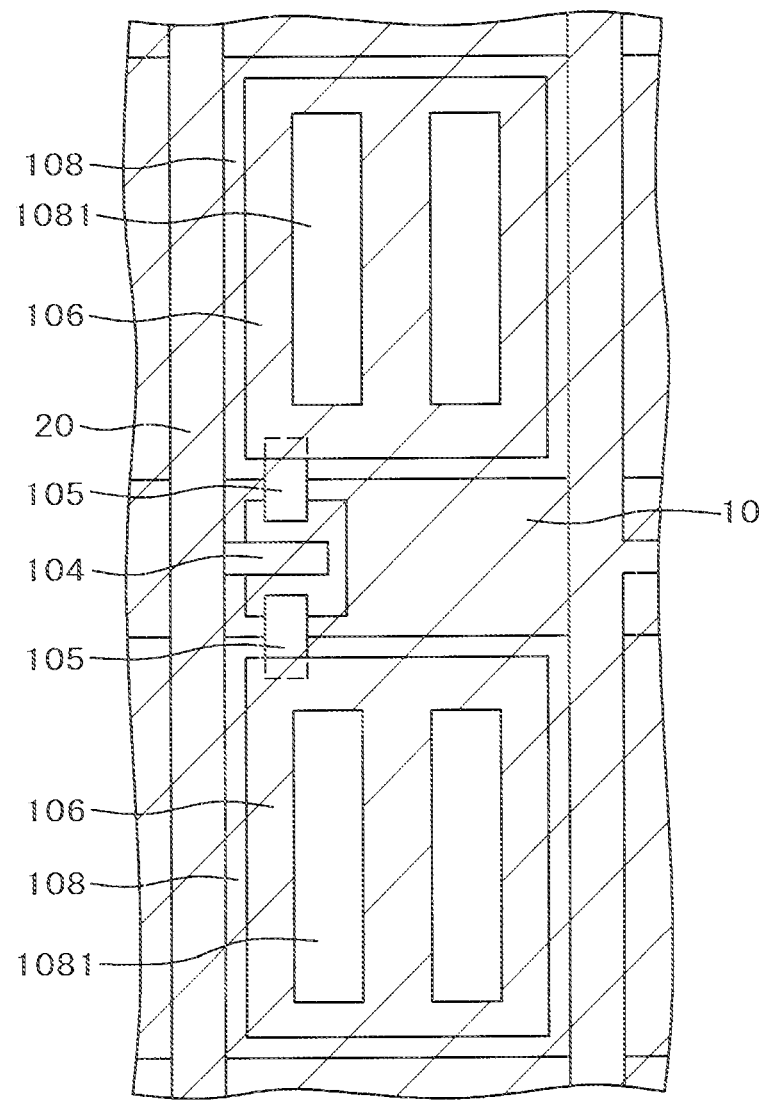
FIG. 12 is a plan view showing a pixel portion according to a third embodiment of the present invention.

FIG. 12 is a plan view showing a pixel configuration according to a third embodiment of the present invention. In FIG. 12, the pixel is centrally formed with the scan line 10 extended in a transverse direction thereof. The lateral sides of the pixel are defined by the picture signal lines 20. Referring to FIG. 12, the pixel consists of a first sub-pixel on the upper side and a second sub-pixel on the lower side. The first sub-pixel is formed with a first pixel electrode 106 while the second sub-pixel is formed with a second pixel electrode 106. The common electrode 108 is laid over the first pixel electrode 106 and the second pixel electrode 106 with the interlayer insulating film 107 (not shown) interposed therebetween. The common electrode 108 is formed with the slits 1081 at places corresponding to the first pixel electrode 106 and the second pixel electrode 106. In FIG. 12, the common electrode 108 is shown cross-hatched.

The TFT is formed on the scan line 10. Specifically, the semiconductor layer 103 is formed on the scan line 10 while the drain electrode 104, a first source electrode 105 and a second source electrode 105 are laid on the semiconductor layer 103. The drain electrode 104 of the TFT is branched from the picture signal line 20. The first source electrode 105 is connected to the first sub-pixel while the second source electrode 105 is connected to the second sub-pixel.

Figure 13:
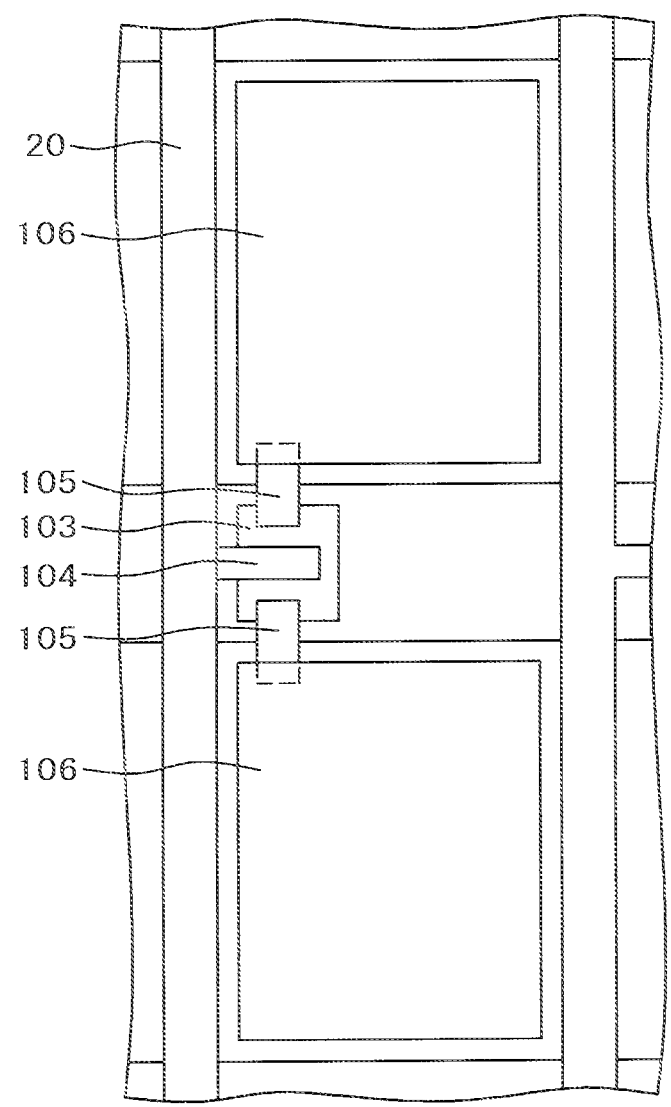
FIG. 13 is a plan view showing the pixel portion of FIG. 12 from which a common electrode is removed.

FIG. 13 is a plan view showing the pixel portion of FIG. 12 from which the common electrode 103 is removed. Referring to FIG. 13, the first sub-pixel and the second sub-pixel are formed with a rectangular pixel electrode 106, respectively. FIG. 13 shows the pixel electrode 106 overlapped on the first source electrode 105 or the second source electrode 105 at the connection. However, the first source electrode 105 and the second source electrode 105 may also be overlapped on the pixel electrodes 106 similarly to the second embodiment.

Figure 14:
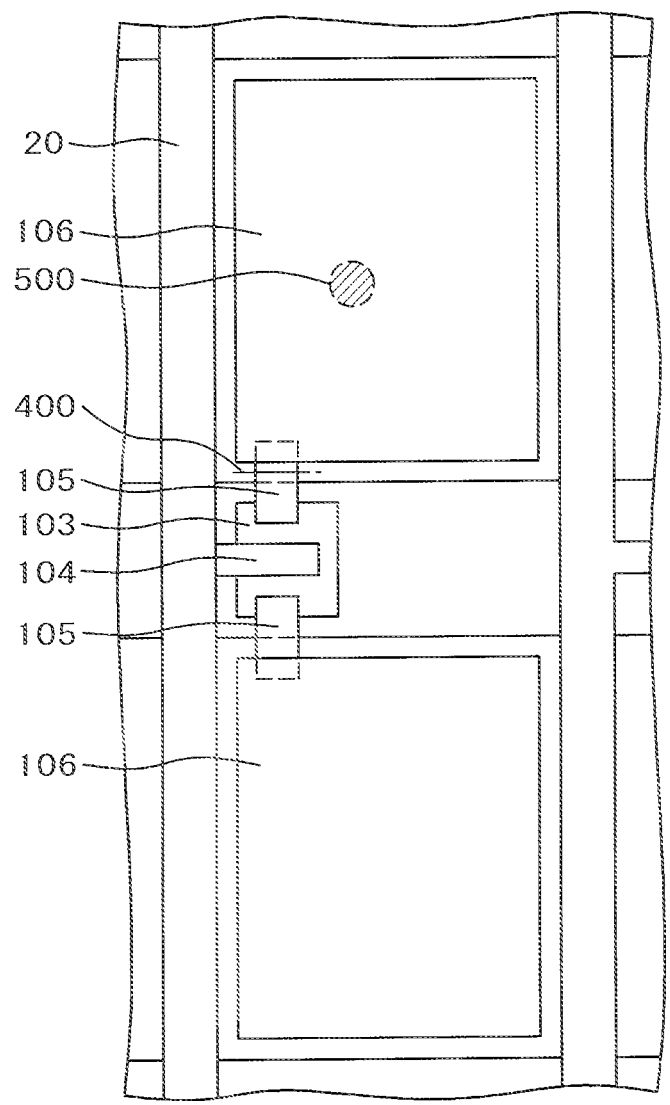
FIG. 14 is a plan view showing a case where a conductive foreign substance is present in the pixel portion of the third embodiment.

As shown in FIG. 14, in the case of invasion of the conductive foreign substance 500 on the pixel electrode 106 of the first sub-pixel on the upper side, the pixel electrode 106 and the common electrode 108 are shorted cut so that the first sub-pixel fails. The shorted first sub-pixel may affect the second sub-pixel on the lower side, disabling the application of a predetermined picture signal between the pixel electrode 106 and the common electrode 108 in the second sub-pixel.

In order to obviate such a trouble, the embodiment is arranged such that the source electrode 105 for the first sub-pixel is cut off by applying the laser radiation along the cut line 400 as shown in FIG. 14. This ensures that if the first sub-pixel fails, the failure does not affect the second sub-pixel. As a result, the pixel defect can be obscured despite the presence of the conductive foreign substance 500. Thus, the full pixel defect can be obviated.

FIG. 12, FIG. 13 and the like show the configuration wherein both the first sub-pixel and the second sub-pixel include the rectangular pixel electrode 106. As described in the first embodiment, however, the pixel electrode 106 of each of the sub-pixels may be segmented while the source electrode 105 may have an interdigital configuration conforming to the segmented pixel electrode 106. This configuration can prevent the failure of the whole sub-pixel even if the conductive foreign substance 500 exists in the sub-pixel, for example. Thus, the risk of the conductive foreign substance 500 causing the pixel defect can be reduced further.

According to the above embodiments, the slits formed in the common electrode have a rectangular shape. The slits may sometimes be formed in a chevron shape such as to provide more uniform directivity across a viewing angle. In this case, the pixel electrode in corresponding relation with the slit may also be formed in the chevron shape whereby the same effect as that described in the foregoing can be obtained.

While the first embodiment and the second embodiment illustrate the configuration wherein the segments of the pixel electrode are located under the slits of the common electrode, the present invention is not limited to this. For example, the present invention may also include a configuration wherein a gap between the pixel electrodes overlaps with the slit. In the configuration wherein the gap between the pixel electrodes is smaller than the width of the slit of the common electrode, for example, the lines of electric force from the common electrode can rotate the liquid crystal molecules. Thus, this configuration can offer the same effect as that described in the foregoing embodiments.

What is claimed is:

1. A liquid crystal display device comprising a TFT substrate, a counter substrate and liquid crystal sandwiched between the TFT substrate and the counter substrate,
   wherein a gate electrode, a gate insulating film and a semiconductor layer are formed on the TFT substrate in this order, and a drain electrode and a source electrode are formed on the semiconductor layer,
   wherein a pixel electrode formed from ITO is laid on the gate insulating film,
   wherein an insulating film is overlaid on the pixel electrode while a common electrode including a slit and formed from ITO is overlaid on the insulating film,
   wherein the pixel electrode is divided into a plurality of segments, each of which is connected to the source electrode,
   wherein the segment of the pixel electrode is overlapped with the slit of the common electrode, and
   wherein the source electrode is an interdigital electrode and the segment of the pixel electrode is in overlapping connection with digit portion of the source electrode.

2. The liquid crystal display device according to claim 1, wherein the segment of the pixel electrode has a width greater than a width of the digit portion of the source electrode.

3. The liquid crystal display device according to claim 1, wherein at the overlap portion, the source electrode is laid on the segment of the pixel electrode.

4. A liquid crystal display device comprising a TFT substrate, a counter substrate and liquid crystal sandwiched between the TFT substrate and the counter substrate,
   wherein a gate electrode extending in a first direction, a gate insulating film and a semiconductor layer are formed on the TFT substrate in this order, and a drain electrode, a first source electrode extending in a second direction perpendicular to the first direction and opposed to the drain electrode, as well as a second source electrode extending in a third direction perpendicular to the first direction and opposite to the second direction and opposed to the drain electrode are formed on the semiconductor layer,
   wherein a first pixel electrode formed from ITO is laid on the gate insulating film and extends in the second direction with respect to the gate electrode,
   wherein a second pixel electrode formed from ITO is laid on the gate insulating film and extends in the third direction with respect to the gate electrode, and
   wherein an insulating film is overlaid on the first and second pixel electrodes while a common electrode formed from ITO is overlaid on the insulating film, the common electrode formed with slits in correspondence to respective ones of the first pixel electrode and the second pixel electrode.

5. The liquid crystal display device according to claim 4, wherein the first source electrode is in overlapping connection with the first pixel electrode while the second source electrode is in overlapping connection with the second pixel electrode.

6. The liquid crystal display device according to claim 4, wherein the first pixel electrode is divided into a plurality of segments, each of which is corresponded by each of the slits of the common electrode, while the second pixel electrode is divided into a plurality of segments, each of which is corresponded by each of the slits of the common electrode.

7. A manufacturing method of a liquid crystal display device comprising a TFT substrate, a counter substrate and liquid crystal sandwiched between the TFT substrate and the counter substrate,
   wherein, in the liquid crystal display device,
   a gate electrode, a gate insulating film and a semiconductor layer are formed on the TFT substrate in this order, and a drain electrode and a source electrode are formed on the semiconductor layer,
   a pixel electrode formed from ITO is laid on the gate insulating film,
   an insulating film is overlaid on the pixel electrode, while a common electrode including a slit and formed from ITO is overlaid on the insulating film, the pixel electrode is divided into a plurality of segments, each of which is connected to the source electrode, the segment of the pixel electrode is overlapped with the slit of the common electrode, and the source electrode is an interdigital electrode and the segment of the pixel electrode is in overlapping connection with a digit portion of the source electrode, and wherein, in the manufacturing method, in the case of conduction between one of the plural segments of the pixel electrode and the common electrode, an overlap portion between the segment of the pixel electrode conducted with the common electrode and the source electrode is cut off by laser radiation.

8. A manufacturing method of a liquid crystal display device comprising a TFT substrate, a counter substrate and liquid crystal sandwiched between the TFT substrate and the counter substrate, wherein, in the liquid crystal display device, a gate electrode extending in a first direction, a gate insulating film and a semiconductor layer are formed on the TFT substrate in this order, and a drain electrode, a first source electrode extending in a second direction perpendicular to the first direction and opposed to the drain electrode, as well as a second source electrode extending in a third direction perpendicular to the first direction and opposite to the second direction and opposed to the drain electrode are formed on the semiconductor layer, a first pixel electrode formed from ITO is laid on the gate insulating film and extends in the second direction with respect to the gate electrode, a second pixel electrode formed from ITO is laid on the gate insulating film and extends in the third direction with respect to the gate electrode, an insulating film is overlaid on the first and second pixel electrodes while a common electrode formed from ITO is overlaid on the insulating film, the common electrode formed with slits in correspondence to respective ones of the first pixel electrode and the second pixel electrode, and the first source electrode is in overlapping connection with the first pixel electrode while the second source electrode is in overlapping connection with the second pixel electrode, and wherein, in the manufacturing method, in the case of conduction between one of the first pixel electrode and the second pixel electrode and the common electrode, an overlap portion between the pixel electrode conducted with the common electrode and the source electrode is cut off by laser radiation.

* * * * *

UNITED STATES PATENT AND TRADEMARK OFFICE
CERTIFICATE OF CORRECTION

PATENT NO.        : 8,553,191 B2                                   Page 1 of 1
APPLICATION NO.   : 13/296690
DATED             : October 8, 2013
INVENTOR(S)       : Takahiro Nagami It is certified that error appears in the above-identified patent and that said Letters Patent is hereby corrected as shown below:

In the Specifications

Figure 15:
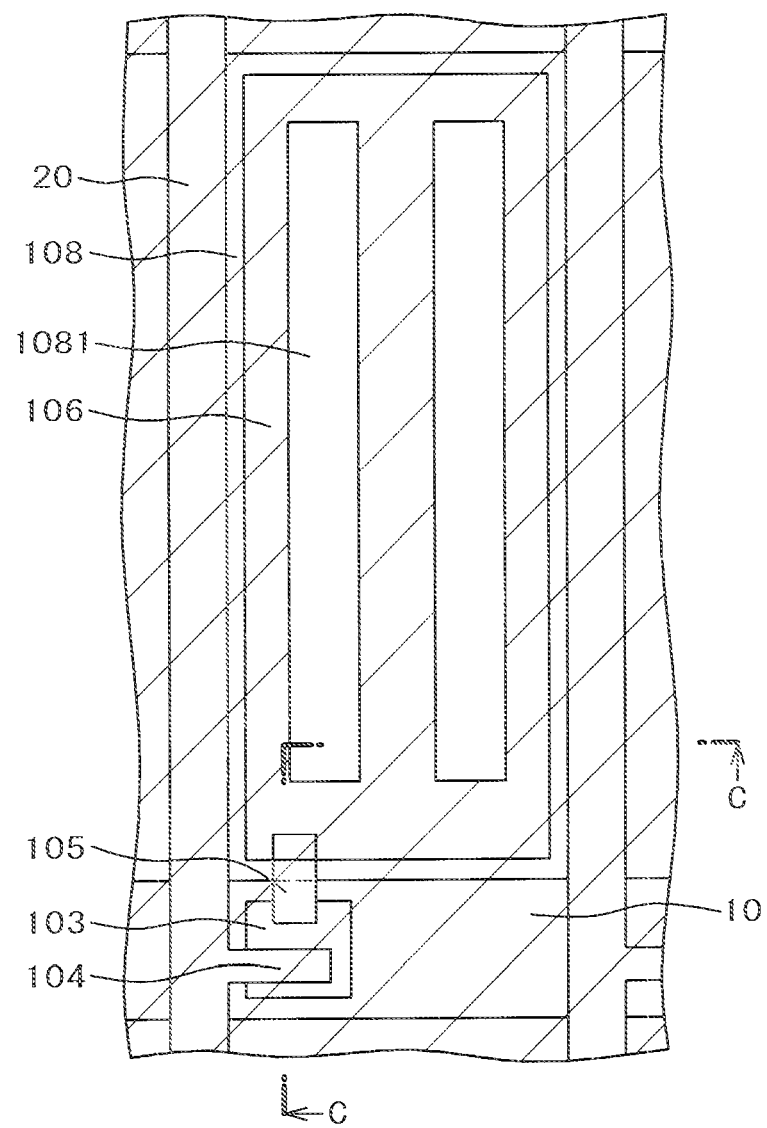
FIG. 15 is a plan view showing an IPS pixel portion to which the present invention is applied.

Column 3, line 4, change "back" to --black--;
Column 3, line 15, change "pixel, defect" to --pixel defect--;
Column 4, line 21, change "TEE" to --THE--;
Column 4, line 67, change "shown FIG. 15" to --shown in FIG. 15--;
Column 6, line 7, change "FIG. 4" to --FIG. 4.--;
Column 7, line 3, change "or" to --of--;
Column 7, line 11, change "our" to --four--;
Column 7, line 25, change "electrode.108" to --electrode 108--; and
Column 9, line 13, change "cut" to --out--.

Signed and Sealed this
Third Day of December, 2013

Margaret A. Focarino
*Commissioner for Patents of the United States Patent and Trademark Office*